(12) United States Patent
Frankenberg et al.

(10) Patent No.: US 11,333,119 B2
(45) Date of Patent: May 17, 2022

(54) SPRING CASING AND STARTER DEVICE WITH A SPRING CASING

(71) Applicant: Andreas Stihl AG & Co. KG, Waiblingen (DE)

(72) Inventors: Christoph Frankenberg, Winnenden (DE); Jens Berger, Merdingen (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 28 days.

(21) Appl. No.: 16/882,613

(22) Filed: May 25, 2020

(65) Prior Publication Data

US 2020/0378351 A1 Dec. 3, 2020

(30) Foreign Application Priority Data

May 28, 2019 (EP) ..................................... 19176934

(51) Int. Cl.
| | | |
|---|---|---|
| *F02N 5/02* | (2006.01) | |
| *F02N 3/02* | (2006.01) | |
| *F16F 1/10* | (2006.01) | |
| *F16F 15/121* | (2006.01) | |
| *F02N 15/00* | (2006.01) | |

(52) U.S. Cl.
CPC ................ *F02N 5/02* (2013.01); *F02N 3/02* (2013.01); *F02N 15/006* (2013.01); *F16F 1/10* (2013.01); *F16F 15/1213* (2013.01)

(58) Field of Classification Search
CPC ................ B65H 2701/35; B65H 75/42; B65H 75/4471; F02N 15/006; F02N 3/02; F02N 5/02; F16F 15/1213; F16F 1/10; F16F 1/12; F16F 2226/04
See application file for complete search history.

(56) References Cited

U.S. PATENT DOCUMENTS

| | | | |
|---|---|---|---|
| 3,375,814 A | | 4/1968 | Hamman |
| 3,952,718 A | * | 4/1976 | Meyer .................. F02B 61/045 123/179.26 |
| 4,019,490 A | * | 4/1977 | Reese .................... F02B 63/02 123/185.2 |
| 4,365,690 A | * | 12/1982 | Zavatkay ................ F16F 1/10 185/45 |
| 4,480,605 A | * | 11/1984 | Bloemers ................ F02N 3/02 123/185.3 |

(Continued)

FOREIGN PATENT DOCUMENTS

| | | |
|---|---|---|
| CN | 201 215 058 | 4/2009 |
| CN | 205 552 715 | 9/2016 |

(Continued)

*Primary Examiner* — Carl C Staubach
(74) *Attorney, Agent, or Firm* — Gudrun E. Huckett (57) ABSTRACT

A spring casing of a starter device of an internal combustion engine has a base body provided with a spring receptacle. A cover plate is provided to cover at least partially the spring receptacle. A connecting device is provided that connects the cover plate and the base body to each other. The connecting device secures the cover plate against a movement relative to the base body in a direction of a center axis of the spring casing. The connecting device only has a first part that is a component of the base body and a second part that is a component of the cover plate and has no further parts. A starter device with such a spring casing is provided.

16 Claims, 10 Drawing Sheets

(56) References Cited

U.S. PATENT DOCUMENTS

| | | | | |
|---|---|---|---|---|
| 6,230,678 | B1 * | 5/2001 | Gracyalny | F02N 5/02 |
| | | | | 123/185.14 |
| 7,114,479 | B1 * | 10/2006 | Lee | F02N 3/02 |
| | | | | 123/185.3 |
| 8,291,879 | B2 * | 10/2012 | Eakins, Jr. | F02N 3/02 |
| | | | | 123/185.3 |
| 9,303,611 | B2 * | 4/2016 | Wenckel | F02N 3/02 |
| 2003/0213455 | A1 * | 11/2003 | Tohyama | F02N 5/02 |
| | | | | 123/185.3 |
| 2004/0065289 | A1 | 4/2004 | Leasure et al. | |
| 2004/0123828 | A1 * | 7/2004 | Sing | F02N 3/02 |
| | | | | 123/185.14 |
| 2005/0051127 | A1 * | 3/2005 | Adam | F02N 15/023 |
| | | | | 123/185.3 |
| 2008/0115756 | A1 * | 5/2008 | Sugishita | F02N 3/02 |
| | | | | 123/185.14 |

FOREIGN PATENT DOCUMENTS

| | | |
|---|---|---|
| DE | 20 2008 015 756 | 5/2010 |
| DE | 20 2012 100 536 | 7/2013 |
| EP | 1 365 143 | 11/2003 |
| EP | 1 865 196 | 12/2007 |
| WO | 2014/137261 | 9/2014 |
| WO | 2015/072900 | 5/2015 |
| WO | 2015/199658 | 12/2015 |

\* cited by examiner

SPRING CASING AND STARTER DEVICE WITH A SPRING CASING

BACKGROUND OF THE INVENTION

The invention relates to a spring casing for a starter device for starting an internal combustion engine, wherein the spring casing comprises a base body with a spring receptacle and a cover plate for at least partial coverage of the spring receptacle, wherein the cover plate and the base body are connectable to each other by at least one connecting means, wherein the connecting means secures the cover plate against a movement relative to the base body in the direction of a center axis of the spring casing. The invention further relates to a starter device with such a spring casing.

WO 2015/072900 A1 discloses a starter device for starting an internal combustion engine with a spring casing that is rotatably supported about an axis of rotation, wherein a spring receptacle of the spring casing is covered by a cover plate. At the circumferential rim of the spring receptacle, the base body of the spring casing comprises screw sleeves which extend in the direction of the axis of rotation. Correspondingly thereto, holes are arranged in the cover plate and completely penetrate the cover plate in the direction of the axis of rotation. For attachment of the cover plate, screws are screwed through the holes of the cover plate into the screw sleeves. The screw sleeves are arranged outwardly of the spring receptacle in radial direction. The spring casing takes up a large space in the radial direction.

The invention has the object to further develop a spring casing of the aforementioned kind such that it can be configured in a simple way to save space.

A further object of the invention resides in providing a starter device with a spring casing that is configured so as to save space.

SUMMARY OF THE INVENTION

In accordance with the invention, the object is achieved in regard to the spring casing in that the at least one connecting means is comprised of a first part at the base body and a second part at the cover plate.

In accordance with the invention, the object is achieved in regard to the starter device in that the at least one connecting means of the spring casing of the starter device is comprised of a first part at the base body and a second part at the cover plate.

In the spring casing according to the invention, the at least one connecting means for securing the cover plate against a movement relative to the base body in the direction of the center axis is comprised of a first part at the base body and a second part at the cover plate. In accordance with the invention, the cover plate is secured by a connecting means against a movement of the cover plate relative to the base body in the direction of the center axis of the spring casing wherein the at least one connecting means is exclusively formed by the base body and the cover plate. For securing against a movement in the direction of the center axis, no additional components of the connecting means are required. Therefore, for securing the cover plate against a movement in the direction of the center axis, no screws are required and therefore also no screw sleeves are required in the base body of the spring casing. In this way, space can be saved, in particular in a direction radial to the center axis. In particular, the arrangement of a screw sleeve in the base body of the spring casing is no longer required in the region of the at least one connecting means. Further connecting means of cover plate and base body can be formed also exclusively by the base body and the cover plate; alternatively, further elements which are formed separate from the base body and the cover plate may be provided.

The center axis is advantageously the axis of rotation about which the spring casing rotates in operation of the starter device. The center axis penetrates advantageously an access opening of the spring receptacle. The center axis extends in particular perpendicularly to a bottom of the spring receptacle.

Expediently, the base body is connectable to the cover plate by a relative movement of the first part of the connecting means relative to the second part of the connecting means in a transverse direction transverse to the center axis in such a way that the cover plate is secured against a movement relative to the base body in the direction of the center axis. The transverse direction extends in particular perpendicularly to the center axis.

In particular, the connecting means is configured to be mountable without requiring a tool. In this way, mounting and demounting of the cover plate is simplified and the time required for mounting and demounting is significantly reduced.

In an advantageous embodiment of the invention, the first part of the at least one connecting means is an opening in the base body and the second part of the connecting means is a projection of the cover plate which corresponds with the opening in the base body. Advantageously, it is provided that the cover plate is inserted with the projection into the opening of the base body and, in this way, is secured against a movement in the direction of the center axis. Expediently, the opening completely penetrates the base body in transverse direction transversely, in particular perpendicularly, to the center axis. However, it can also be provided that the opening is formed only as a depression in the base body. Expediently, the opening then only partially penetrates the base body in transverse direction. In particular, in the connected state of cover plate and base body, the projection projects in the transverse direction transverse to the center axis, in particular in the direction perpendicular to the center axis, past the spring receptacle. In this way, the spring casing can be designed such that the cover plate covers the spring receptacle all the way to its rim and, at the same time, is secured with its projection in the opening of the base body against a movement in the direction of the center axis. Expediently, the projection projects in transverse direction past the spring receptacle, advantageously however does not project past an outer circumference of the base body of the spring casing. Particularly advantageously, an outer circumference of an outer wall of the spring receptacle is positioned in radial direction outwardly relative to the projection.

In an advantageous further embodiment of the invention, at least two connecting means, comprised only of a first part at the base body and a second part at the cover plate, are provided for securing against a movement of the cover plate relative to the base body in the direction of the center axis, wherein the at least two connecting means are arranged within a circumferential angle range, measured in the connected state of cover plate and base body relative to the center axis, of less than 180°, in particular less than 135°, preferably less than 110°. In particular, a plurality of projections are provided. In this context, each of the connecting means comprised of a first part at the base body and a second part at the cover plate comprises at least one projection. Advantageously, all projections are arranged at the cover plate in the circumferential angle range that is measured in the connected state of cover plate and base body relative to the center axis and is within a range of less than 180°, in particular less than 135°, preferably less than 110°. All projections of the cover plate extend advantageously completely within one half of the cover plate. The term "projection" relates exclusively to a projection that forms the first part of the connecting means comprised of the first part at the base body and the second part at the cover plate.

Expediently, the opening comprises a closed circumferential rim. Advantageously, the projection inserted into the opening is pretensioned against the rim of the opening. The projection inserted into the opening is pretensioned in this context in particular in the direction of the center axis against the rim of the opening.

In an advantageous further embodiment of the invention, it is provided that the projection of the cover plate in the opening is contacting with a top side of the cover plate a projection contact surface of the base body and that the cover plate, outside of the opening, is contacting with a bottom side of the cover plate a contact surface of the base body. In this way, the spring casing can be designed in a simple way such that the cover plate is secured in the direction of the center axis without clearance in the base body. Expediently, the contact surface extends at a slant to a virtual plane that is perpendicular to the center axis. In this way, the contact surface can be designed such that the cover plate can be inserted in a simple way into the opening of the base body and, at the same time, it is ensured that the cover plate with its bottom side is contacting the contact surface. The contact surface forms advantageously a ramp along which the cover plate is guided into the opening upon insertion of the projection. Expediently, the bottom side of the cover plate is facing the spring receptacle and the top side of the cover plate is facing away from the spring receptacle.

In an advantageous further embodiment of the invention, the spring casing comprises, in addition of the at least one connecting means, a second connecting means that is formed separate from the at least one connecting means and that secures the cover plate against a movement relative to the base body in transverse direction. In this way, the cover plate can be secured in a simple way against sliding out of the opening in the base body in transverse direction. In this way, it can be ensured in a simple way that the cover plate is secured against a movement relative to the base body in the direction of the center axis. Expediently, the second connecting means comprises a screw which is spaced at a distance from the center axis.

Expediently, the at least one connecting means that is comprised of the first part at the base body and the second part at the cover plate, preferably all of the connecting means comprised of a first part at the base body and a second part at the cover plate, is arranged in a first half of the spring casing. Advantageously, the second connecting means is arranged in a second half of the spring casing. In this context, the transverse direction extends from the second half of the spring casing to the first half of the spring casing.

In an advantageous further embodiment of the invention, it is provided that a circumferential wall of the spring receptacle extending circumferentially about the center axis comprises a smallest distance to the center axis and that, in the connected state of cover plate and base body, the distance of an outer contour of the cover plate relative to the center axis in a continuous angle range of at least 270°, in particular of at least 320°, is less than 110% of the smallest distance of the circumferential wall relative to the center axis. In this way, the spring casing in the radial direction relative to the center axis can be designed in a space-saving way. Preferably, the radial extension of the spring casing in the region of the at least one projection is less than the radial extension that is required for arranging a screw sleeve at the outer circumference of the spring casing.

In a particular embodiment of the invention, the spring casing and a rope pulley for the starter rope for starting the internal combustion engine are formed together as one piece.

Expediently, the rope pulley for receiving the starter rope comprises a recess circumferentially extending about the center axis and provided with a base. Advantageously, the contour of the bottom follows a circular shape in a continuous angle range of at least 270°. Expediently, the bottom in the continuous angle range of at least 270° has a constant distance relative to the center axis. Advantageously, the contour of a lateral rim of the recess follows a circular shape in the continuous angle range of at least 270°. In this way, the recess for guiding the rope of a rope pulley can extend uninterrupted or undisturbed in the region of the at least one connecting means comprised of a first part at the base body and a second part at the cover plate. In the region of the at least one connecting means that is comprised of a first part at the base body and a second part at the cover plate, no screw sleeves must be arranged which possibly could project into the recess and/or would mean an enlargement of the outer diameter of the spring casing. In this way, the starter rope can be wound onto and unwound from the recess, substantially undisturbed by irregularities, in a space-saving way.

Since no screw sleeves are required for the connecting means according to the invention, the circumferential wall of the spring receptacle can be configured to be thin across a large angle range since no material for forming the screw sleeve is required thereat. Accordingly, the spring casing according to the invention can be used in a region of the cooling air flow of a power tool and, due to the compact configuration of the spring casing, a good cooling air supply is provided.

The starter device according to the invention comprises a spring casing according to the invention. In this way, the starter device can be configured in a space-saving way.

BRIEF DESCRIPTION OF THE DRAWING

Embodiments of the invention will be explained in the following with the aid of the drawing.

DESCRIPTION OF THE PREFERRED EMBODIMENTS

Figure 1:
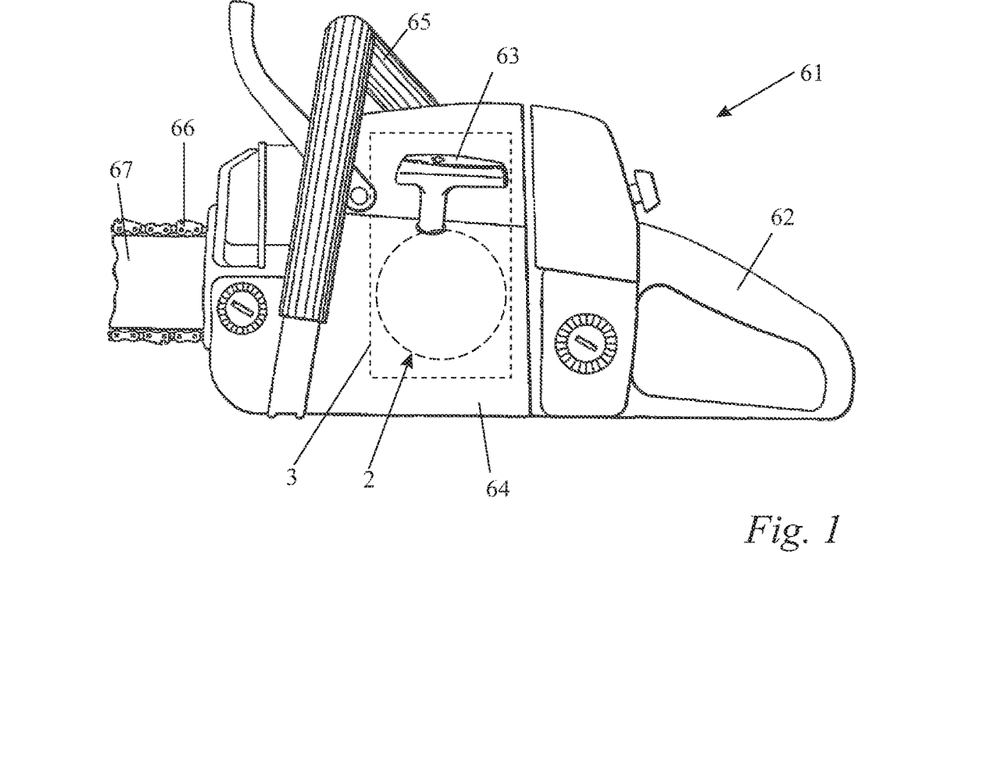
FIG. 1 is a schematic side view of a motor chainsaw.

FIG. 1 shows a hand-guided power tool 61, in the embodiment a motor chainsaw. The present invention can be provided also in other types of hand-guided power tools, for example, a blower, a trimmer, a cut-off machine or the like. The hand-guided power tool 61 comprises a housing 64 in which a schematically illustrated combustion engine 3 is arranged. The combustion engine 3 is preferably a single-cylinder engine, in particular a two-stroke engine or a mixture-lubricated four-stroke engine. The internal combustion engine 3 serves for driving a tool. In the embodiment, the tool is a saw chain 66 which is driven in circulation about a guide bar 67. For guiding the power tool 61, a handle 62 as well as a tubular grip 65 are provided. For starting the internal combustion engine 3, a starter device 2 is provided which is also indicated schematically in FIG. 1. The starter device 2 is preferably a manually actuated rope starter. The starter device 2 comprises for this purpose a starter handle 63 which projects from the housing 64 of the power tool 61. The starter device 2 can be alternatively or additionally motor-operated.

Figure 2:
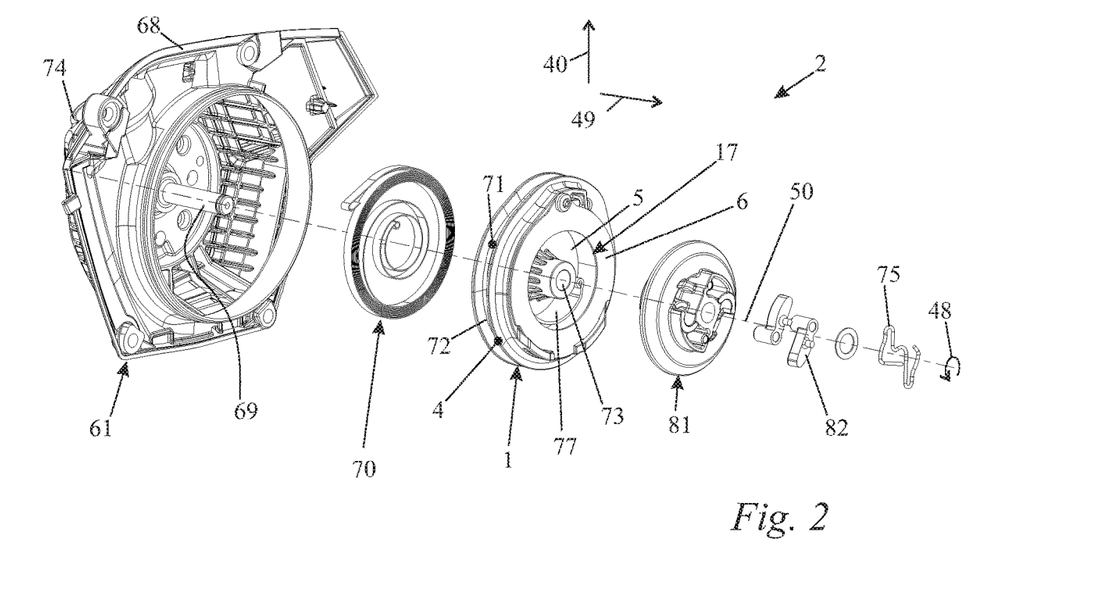
FIG. 2 is an exploded illustration of a starter device with a spring casing.

In FIG. 2, the starter device 2 is illustrated in detail. The starter device 2 comprises a starter housing 68, a restoring spring 70, a spring casing 1, a connecting spring 77, and a follower 81. The spring casing 1 comprises a rope pulley 72 in the embodiment. The rope pulley 72 is an integral component of the spring casing 1. A separate configuration of rope pulley and spring casing can be provided also.

The starter housing 68 comprises a bearing pin 69. On the bearing pin 69, the spring casing 1 and the follower 81 are rotatably supported. For this purpose, the spring casing 1 comprises a hub 73. The bearing pin 69 is pushed through the hub 73. The spring casing 1 and thus also the rope pulley 72 are connected by the restoring spring 70 to the starter housing 68. The restoring spring 70 is a spiral spring in the embodiment. The restoring spring 70 is arranged between the starter housing 68 and the spring casing 1 in a restoring spring receptacle, not illustrated, of the spring casing 1. One end of the restoring spring 70 is fixedly connected to the starter housing 68 and the other end is fixedly connected to the spring casing 1. The spring casing 1 is connected by the connecting spring 77 to the follower 81. The connecting spring 77 is advantageously a spiral spring. The connecting spring 77 is arranged between the spring casing 1 and the follower 81 in a spring receptacle 5 of the spring casing 1. The connecting spring 77 is arranged on the side of the spring casing 1 which is facing away from the restoring spring receptacle.

The starter device 2 serves for starting the combustion engine 3 illustrated in FIG. 1. A starter rope, not illustrated in FIG. 2, is wound onto the rope pulley 72. A first end of the starter rope is secured at the rope pulley 72. A second end of the starter rope is guided through a starter socket 74 of the starter housing 68 out of the starter housing 68. When starting the internal combustion engine 3, the operator pulls on the starter handle 63, illustrated in FIG. 1, which is secured at the second end of the starter rope. Pulling on the starter rope causes the rope pulley 72, illustrated in FIG. 2, to rotate and thus also the spring casing 1 to rotate about an axis of rotation which is referred to in the following as center axis 50. In this context, the rope pulley 72 rotates about the bearing pin 69. The center axis 50 extends in axial direction 49. The axial direction 49 extends from the restoring spring receptacle of the spring casing 1 in the direction toward the spring receptacle 5 for accommodating the connecting spring 77. A transverse direction 40 is extending transverse thereto, in the embodiment perpendicular to the center axis 50.

The rotation energy of the rope pulley 72 and of the spring casing 1 is transmitted by the connecting spring 77 to the follower 81. The connecting spring 77 serves in this context for damping sudden and non-uniform pulling movements. It can also be provided that the connecting spring 77 serves for intermediate storage of energy. In this context, it can be provided that the connecting spring must first be tensioned by a plurality of pulls at the starter rope prior to the connecting spring releasing its stored energy through the follower to a crankshaft of the internal combustion engine. In this case, the rope pulley is typically connected by a free wheel device to the spring casing.

The follower 81 comprises coupling means 82. In the embodiment, the coupling means 82 are configured as pawls. The coupling means 82 are pivotably supported at the follower 81. During starting, the coupling means 82 pivot, guided by a locking contour 75, in outward direction and interact with locking projections, not illustrated, which are fixedly connected to the crankshaft so that the crankshaft rotates together with the follower 81. When the crankshaft rotates faster than the follower 81, the coupling means 82 lose contact with the locking projections. At this point in time, the starting process is already terminated and the crankshaft is driven by the internal combustion engine 3.

Due to the rotation of the rope pulley 72 during the starting stroke, the restoring spring 70 is tensioned also. After completion of a starting stroke, the rope pulley 72, and thus also the spring casing 1, is caused to rotated by means of the restoring spring 70 in a direction opposite to its rotation direction when pulling the starter rope so that the starter rope is wound again onto the rope pulley 72.

Figure 3:
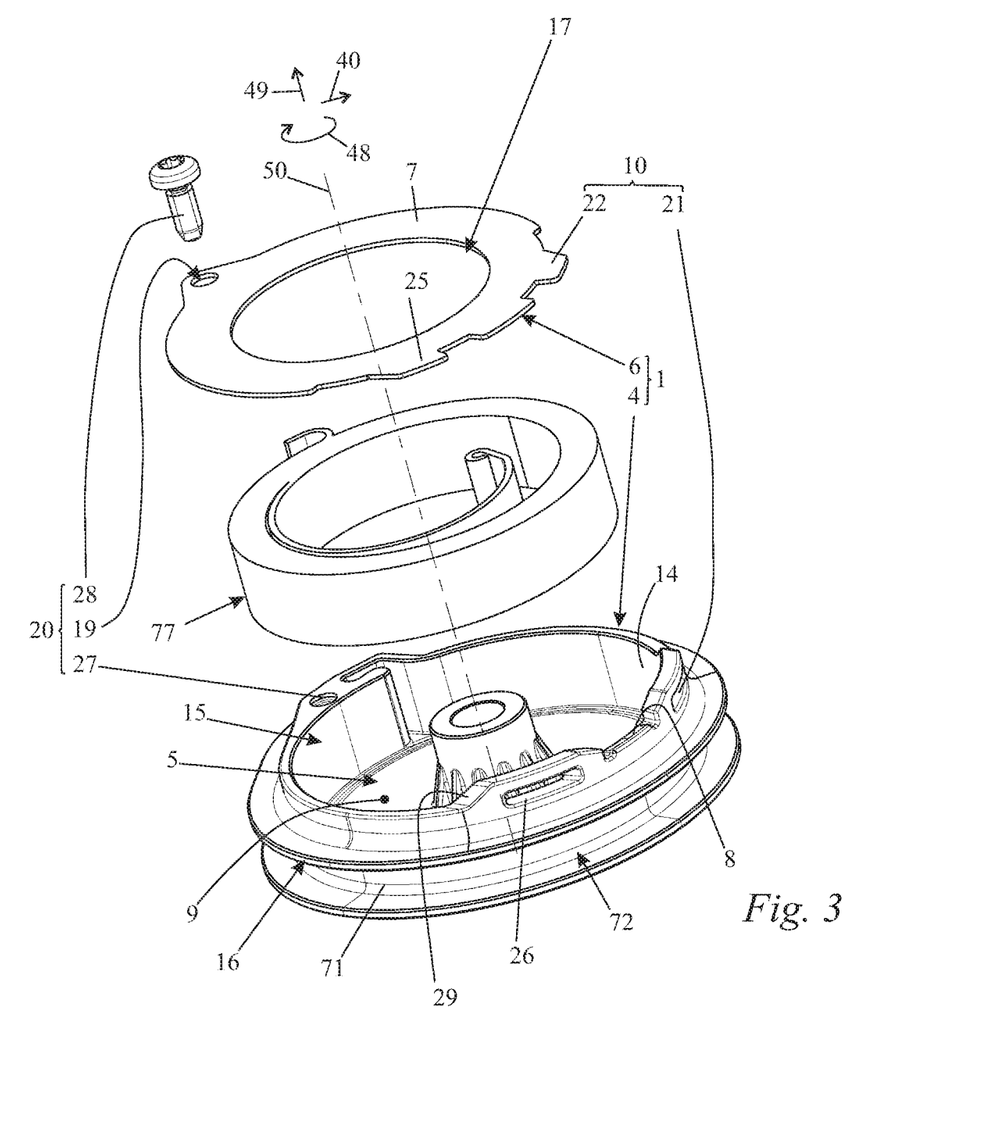
FIG. 3 is an exploded illustration of the spring casing of FIG. 2 with a base body and a cover plate.
Figure 4:
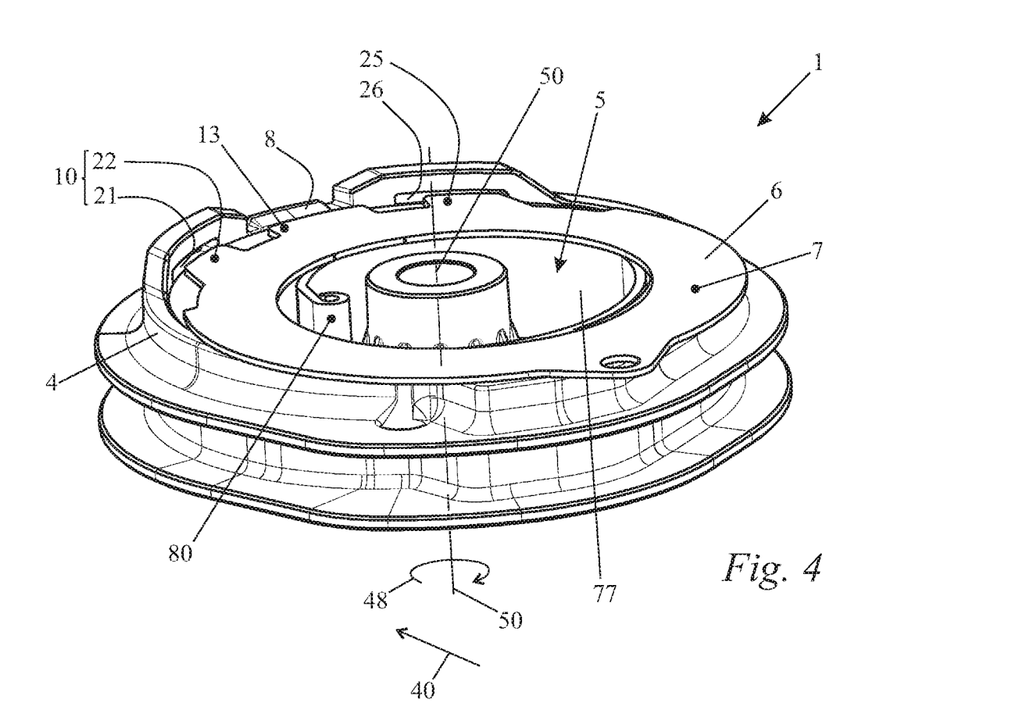
FIG. 4 is a perspective illustration of the spring casing of FIG. 3 in an unconnected state of cover plate and base body.

As illustrated in FIG. 3, the spring casing 1 comprises a base body 4 and a cover plate 6. The spring receptacle 5 is formed in the base body 4. The spring receptacle 5 comprises a bottom 9. The bottom 9 extends in a plane. The center axis 50 extends perpendicularly to the plane of the bottom 9 of the spring receptacle 5. The spring receptacle 5 comprises an access opening 15. The access opening 15 is positioned opposite the bottom 9, viewed in axial direction 49. Through the access opening 15, the connecting spring 77 can be inserted into the spring receptacle 5. The access opening 15 extends radially relative to the center axis 50 advantageously all the way up to a circumferential wall 14 of the spring receptacle 5. The center axis 50 is the axis of rotation about which the spring casing 1 is rotating in operation of the starter device 2. The center axis 50 extends through the access opening 15. For protection against soiling and for a safe support of the connecting spring 77, the cover plate 6 can be arranged on the base body 4 of the spring casing 1.

The base body 4 comprises an outer circumferential rim 16 extending about the center axis 50 in circumferential direction. The outer circumferential rim 16 extends in circumferential direction 48 about the center axis 50. In the circumferential rim 16 a circumferential recess 71 is arranged. By means of the circumferential recess 71 in the circumferential rim 16 of the spring casing 1, the receptacle of the rope pulley 72 for the starter rope is formed. By means of the recess 71, the circumferential rim 16 is recessed in a radial direction toward the center axis 50.

In axial direction 49, an opening 21 is arranged in the base body 4 adjacent to the recess 71. In the embodiment, the opening 21 penetrates completely the base body 4 in transverse direction 40. The opening 21 is arranged in an outer wall 29 of the base body 4. The outer wall 29 extends circumferentially about the center axis 50. The opening 21 penetrates the outer wall 29 completely in transverse direction 40. In the axial direction 49, the opening 21 is at least partially arranged outwardly relative to the spring receptacle 5. In the embodiment, the outer wall 29 extends in an extension relative to the circumferential wall 14 of the spring receptacle 5. The opening 21 adjoins in axial direction 49 the spring receptacle 5 or its circumferential wall 14.

The cover plate 6 comprises a projection 22. The projection 22 is part of a connecting means 10 that is comprised exclusively of the base body 4 and the cover plate 6. The term "projection" relates exclusively to the part of the cover plate 6 that forms together with the base body 4 the connecting means 10. The projection 22 projects past a cover body 7 of the cover plate 6. The cover body 7 of the cover plate 6 is the region of the cover plate 6 which covers the access opening 15 of the spring receptacle 5. The projection 22 of the cover plate 6 corresponds with regard to its position and size to the opening 21 of the base body 4. The projection 22 can be inserted into the opening 21. In this way, the cover plate 6 and the base body 4 are connectable to each other. The opening 21 forms a first part at the base body 4 which, together with a second part at the cover plate 6 that is formed by the projection 22, forms the connecting means 10. In the connected state of base body 4 and cover plate 6, the connecting means 10 secures the cover plate 6 against a movement relative to the base body 4 in the direction of the center axis 50 of the spring casing 1.

FIGS. 4 through 10 show how the cover plate 6 is inserted into the base body 4. In this context, the base body 4 is connected to the cover plate 6 by a relative movement of the first part of the connecting means 10 relative to the second part of the connecting means 10 in transverse direction 40 in such a way that the cover plate 6 is secured against a movement relative to the base body 4 in the direction of the center axis 50. This is achieved in that the cover plate 6 is pushed with its projection 22 in transverse direction 40 into the opening 21 of the base body 4. This does not require a tool. The connecting means 10 can be mounted without a tool. The connecting means 10 is comprised exclusively of the first part at the base body 4 and the second part at the cover plate 6. In particular, the securing action of the cover plate 6 against a movement relative to the base body 4 in the direction of the center axis 50 is realized by the connecting means 10 without screws. The transverse direction 40 corresponds to an insertion direction of the projection 22 of the cover plate 6 into the opening 21 of the base body 4.

Figure 5:
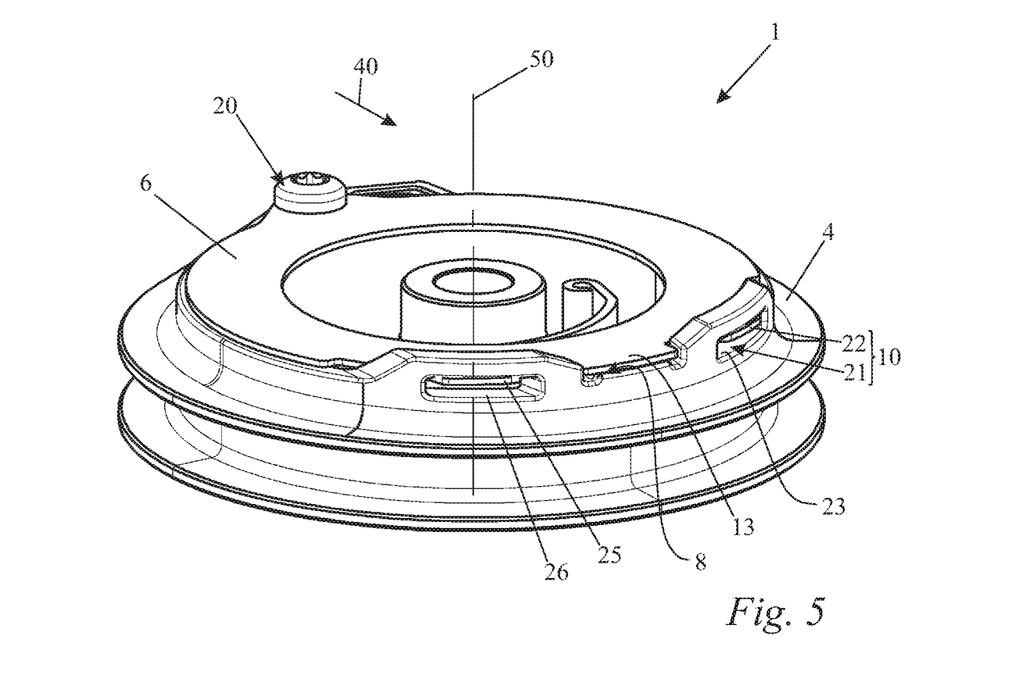
FIG. 5 is another perspective illustration of the spring casing of FIG. 3 in a connected state of cover plate and base body.
Figure 6:
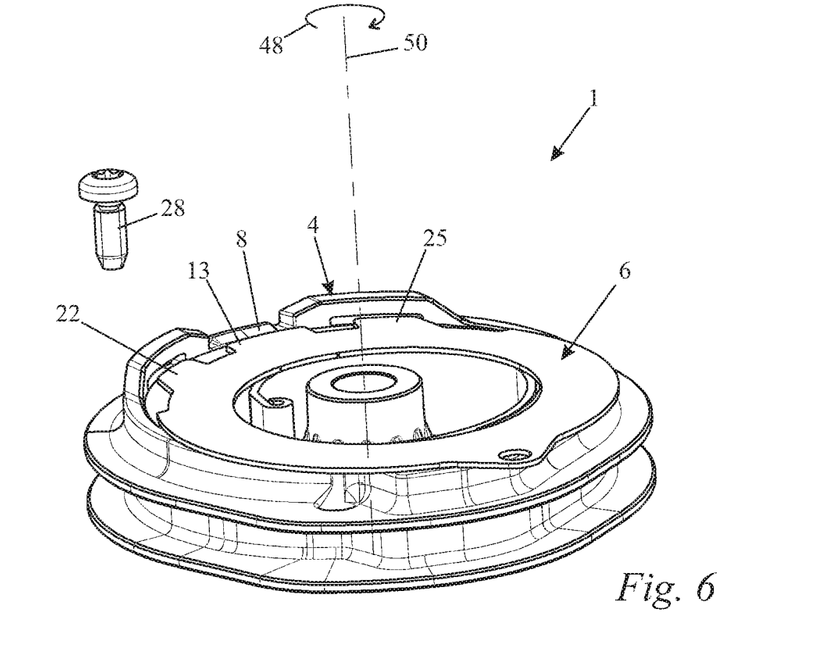
FIG. 6 is a perspective illustration of the spring casing of FIG. 3 in the unconnected state of cover plate and base body.
Figure 7:
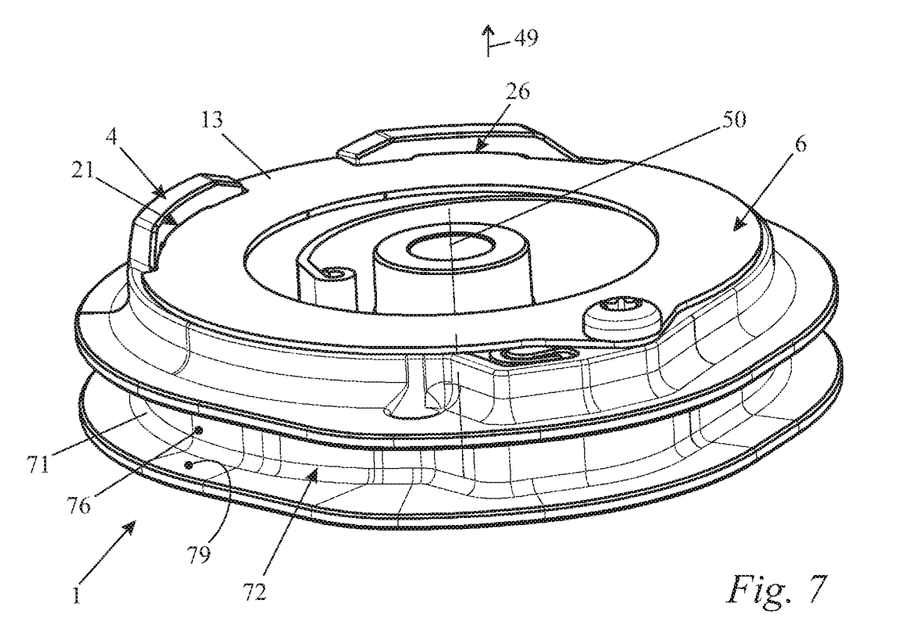
FIG. 7 is a perspective illustration of the spring casing of FIG. 3 in the connected state of cover plate and base body.
Figure 10:
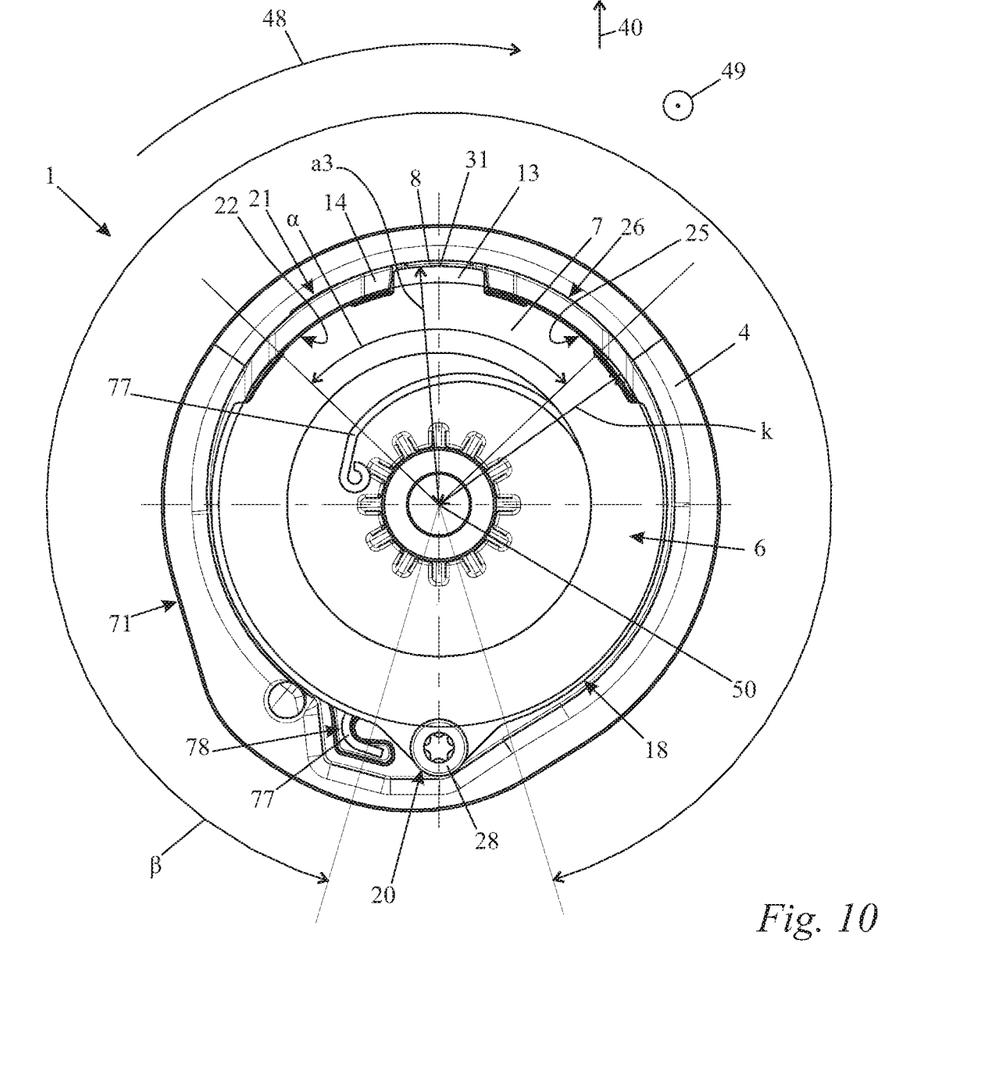
FIG. 10 is a plan view from above onto the spring casing of FIG. 3 in the connected state of base body and cover plate.

For example, FIGS. 5, 7, and 10 show the spring casing 1 in a connected state of cover plate 6 and base body 4. In the connected state of base body 4 and cover plate 6, the cover plate 6 covers the spring receptacle 5 at least partially. In this way, the access opening 15 of the spring receptacle 5 is at least partially covered.

The cover plate 6 comprises at its center a through opening 17. In the connected state of cover plate 6 and base body 4, the center axis 50 projects through the through opening 17. The cover plate 6 encloses the through opening 17 advantageously completely. In the assembled state of the starter device 2, the follower 81 illustrated in FIG. 2 covers the through opening 17 of the cover plate 6 advantageously completely, with the exception of the region of the through opening 17 in which the hub 73 is arranged. In the connected state of base body 4 and cover plate 6, the spring receptacle 5 is almost completely closed off in this way.

Figure 8:
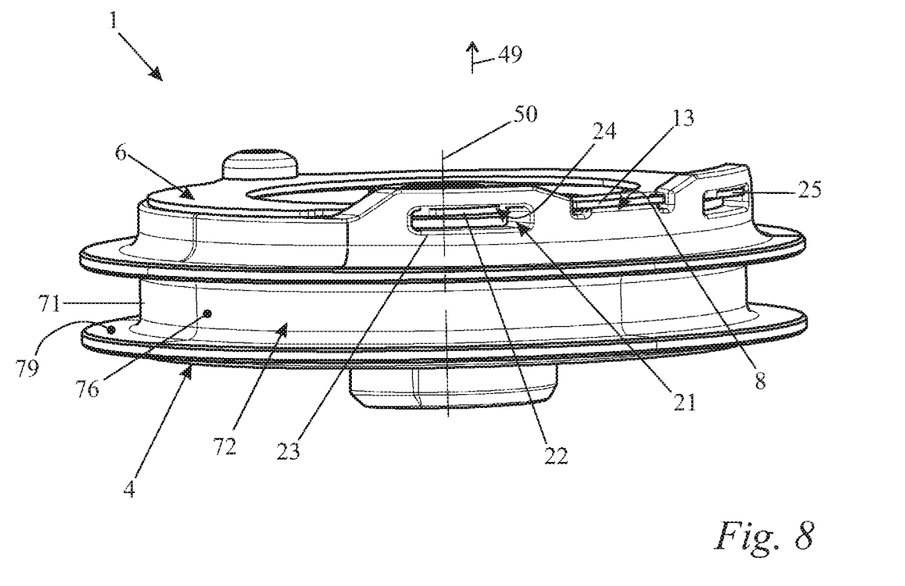
FIG. 8 is a perspective side view of the spring casing of FIG. 3 in the connected state of cover plate and base body.
Figure 9:
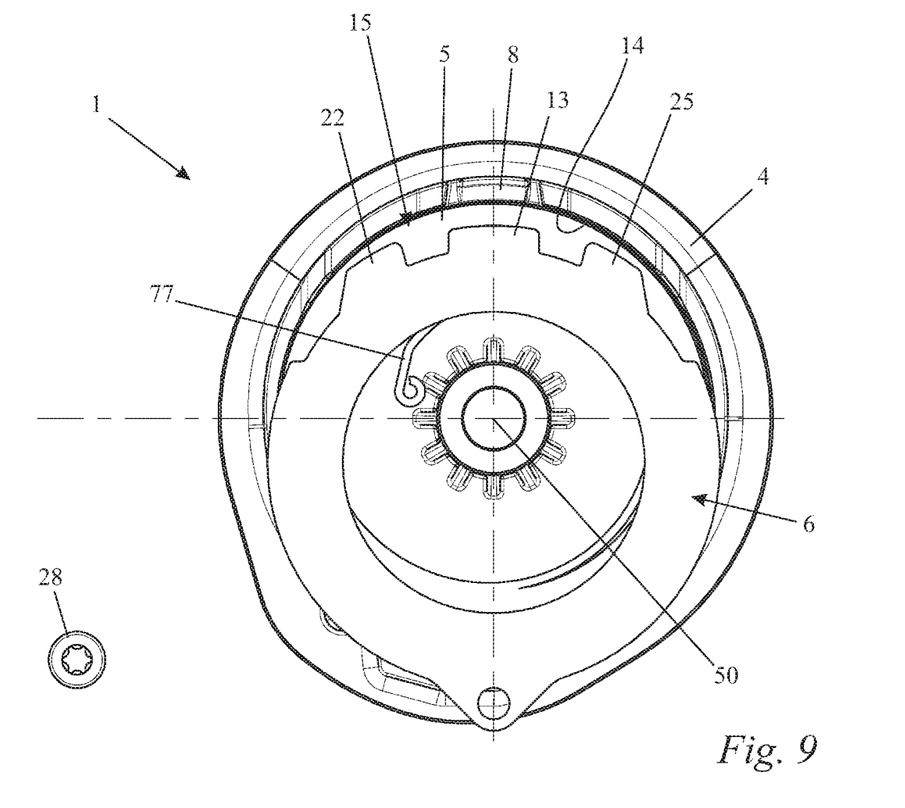
FIG. 9 is a plan view from above onto the spring casing of FIG. 3 in the unconnected state of base body and cover plate.

As can be seen when looking at FIGS. 9 and 10 together, the projection 22 in the connected state of cover plate 6 and base body 4 illustrated in FIG. 10 projects in transverse direction 40 past the spring receptacle 5. As illustrated in FIGS. 5 and 8, the projection 22 of the cover plate 6 in the connected state of base body 4 and cover plate 6 projects into the opening 21 in the base body 4. The opening 21 comprises a closed peripheral rim 23. The peripheral rim 23 of the opening 21 extends about the transverse direction 40. In the connected state of base body 4 and cover plate 6, the projection 22 is pretensioned against the peripheral rim 23 of the opening 21. For pretensioning the projection 22 against the peripheral rim 23 of the opening 21 in the direction of the center axis 50, the spring casing 1 is configured such that the projection 22 of the cover plate 6 arranged in the opening 21 is contacting with a top side 11 of the cover plate 6 the peripheral rim 23 of the opening 21 and in that, at the same time, the cover plate 6 outside of the opening 21 is contacting with a bottom side 12 of the cover plate 6 a contact surface 8 of the base body 4. In the connected state of the base body 4 and of the cover plate 6, the cover plate 6 contacts the base body 4 with its bottom side 12 as well as with its top side 11. Due to the two-sided contact, the cover plate 6 is secured in the direction of the center axis 50. In the connected state of the base body 4 and of the cover plate 6, the top side 11 of the cover plate 6 is facing away from the bottom 9 of the spring receptacle 5. In the connected state of the base body 4 and of the cover plate 6, the bottom side 12 of the cover plate 6 is facing the bottom 9 of the spring receptacle 5 of the base body 4.

In the embodiment, the cover plate 6 comprises a tensioning protrusion 13. The tensioning protrusion 13 of the cover plate 6 projects past the cover body 7 of the cover plate 6. As illustrated in FIG. 10, in the connected state of base body 4 and cover plate 6, the cover body 7 of the cover plate 6 covers at least partially the access opening 15 of the spring receptacle 5 illustrated in FIG. 9. The part of the cover plate 6 which projects past the spring receptacle 5 in the connected state of the base body 4 and the cover plate 6, viewed in the direction of the center axis 50, does not form part of the cover body 7. In other words, the cover body 7 is formed only by the part of the cover plate 6 which, viewed in the direction of the longitudinal axis 50, does not project past the spring receptacle 5.

Figure 11:
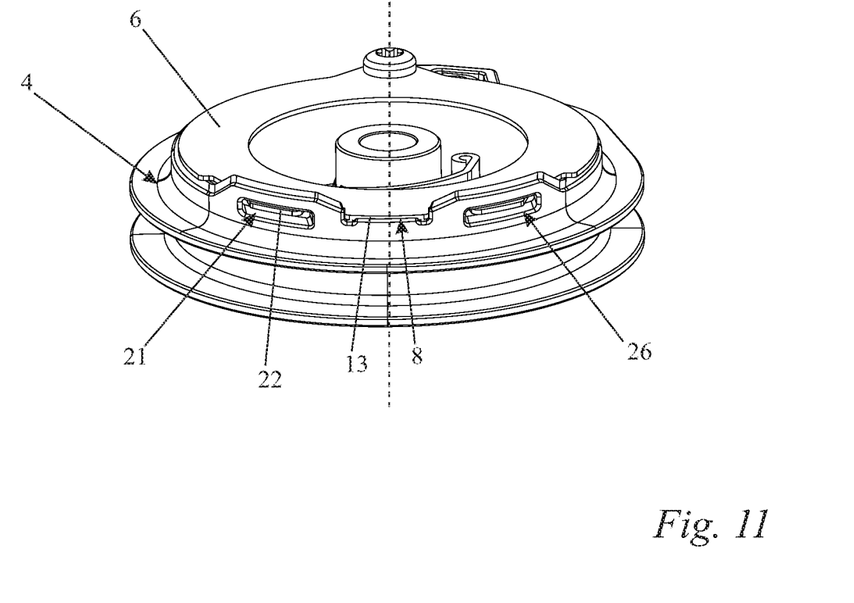
FIG. 11 is a perspective illustration of the spring casing of FIG. 3.

As illustrated in FIG. 10, the tensioning protrusion 13 projects past the cover body 7 of the cover plate 6 in transverse direction 40. In the embodiments, the bottom side 12 of the cover plate 6 is contacting with the tensioning protrusion 13 of the cover plate 6 the support surface 8 of the base body 4 in the connected state of the base body 4 and of the cover plate 6. It can also be provided that the projection 22 inserted into the opening 21 is contacting with the bottom side 12 the rim 23 of the opening 21. In this case, the cover plate 6, outside of the opening 21, is contacting with its top side 11 a protrusion or an opening of the base body 4. In any case, the projection 22 inserted through the opening 21 is pretensioned in the direction of the center axis 50, i.e., either in axial direction 49 or opposite to the axial direction 49, relative to the part of the cover plate 6 which is contacting the base body 4 outside of the opening 21. This can be realized, for example, as illustrated in detail in FIGS. 11 and 12.

Figure 12:
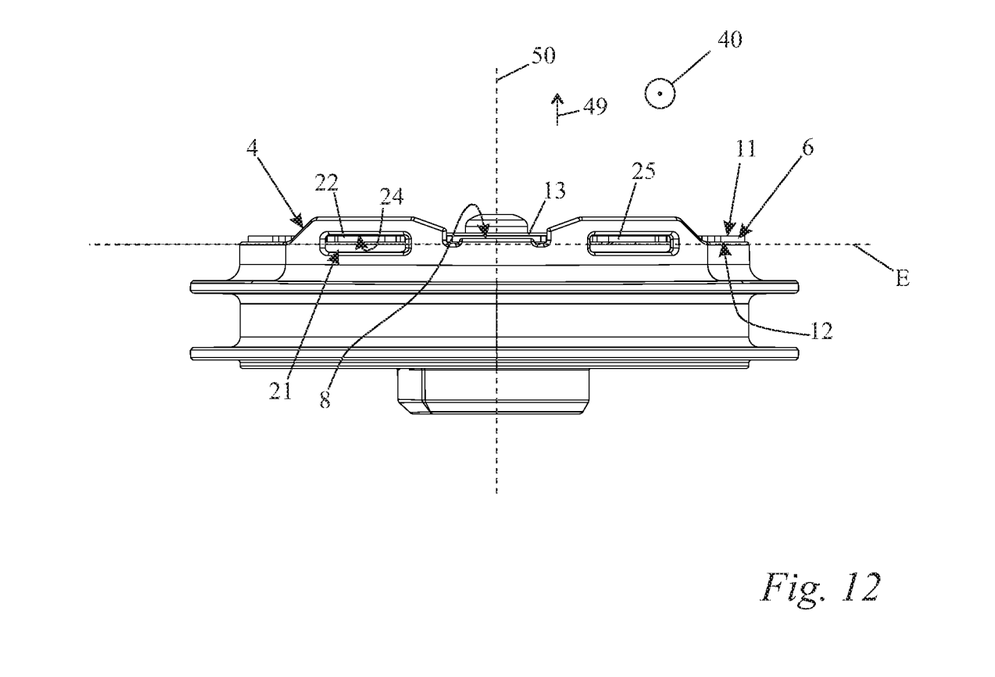
FIG. 12 is a side view of the circumferential side of the spring casing of FIG. 3.

As illustrated in FIG. 12, the rim 23 of the opening 21 in the base body 4 has a projection contact surface 24. The projection contact surface 24 is facing the bottom 9 of the spring receptacle 5. The projection contact surface 24 is formed in the part of the rim 23 of the opening 21 which is farthest removed from the bottom 9 of the spring receptacle 5. The projection contact surface 24 extends advantageously parallel to the bottom 9 of the spring receptacle 5. The top side 11 of the cover plate 6 at the projection 22 is contacting the projection contact surface 24 in a projection contact region. The projection contact surface 24 extends transversely, in the embodiment perpendicularly, to the axial direction 49 of the center axis 50. In a direction opposite to the axial direction 49, the cover plate 6 is delimited by a virtual plane E in the connected state of base body 4 and cover plate 6. The virtual plane E extends perpendicular to the center axis 50. The virtual plane E is illustrated also in FIGS. 16 and 18.

Figure 18:
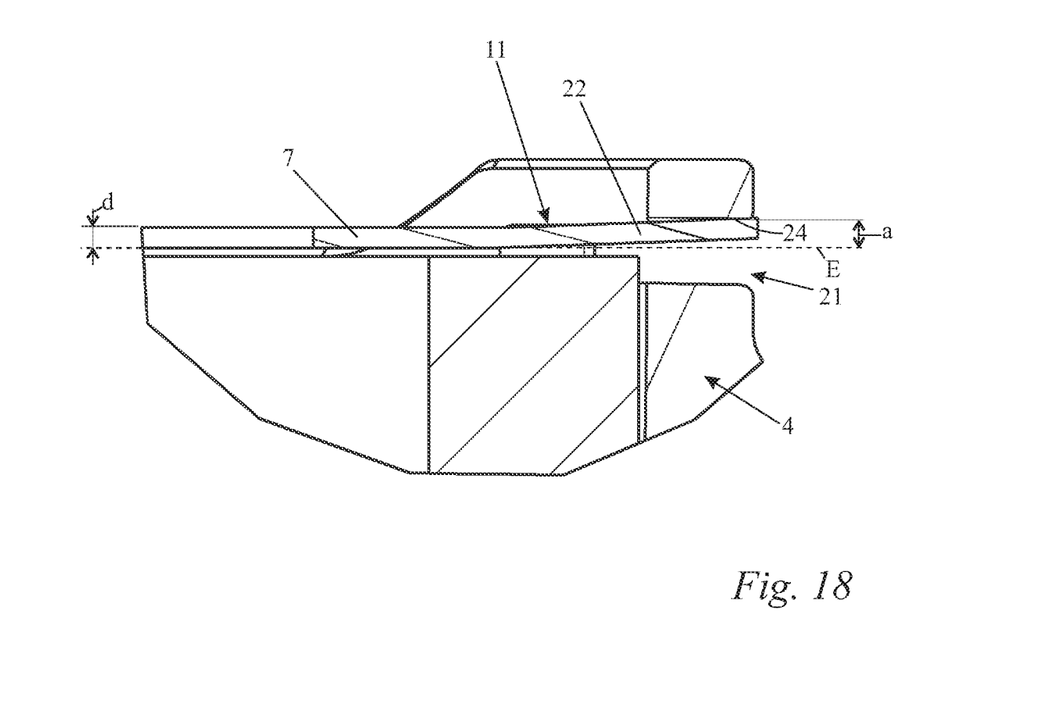
FIG. 18 is a detail illustration of the region that is indicated by XVIII in FIG. 17.

As illustrated in FIG. 18, the projection contact region of the projection contact surface 24 has a smallest distance a to the virtual plane E.

Figure 16:
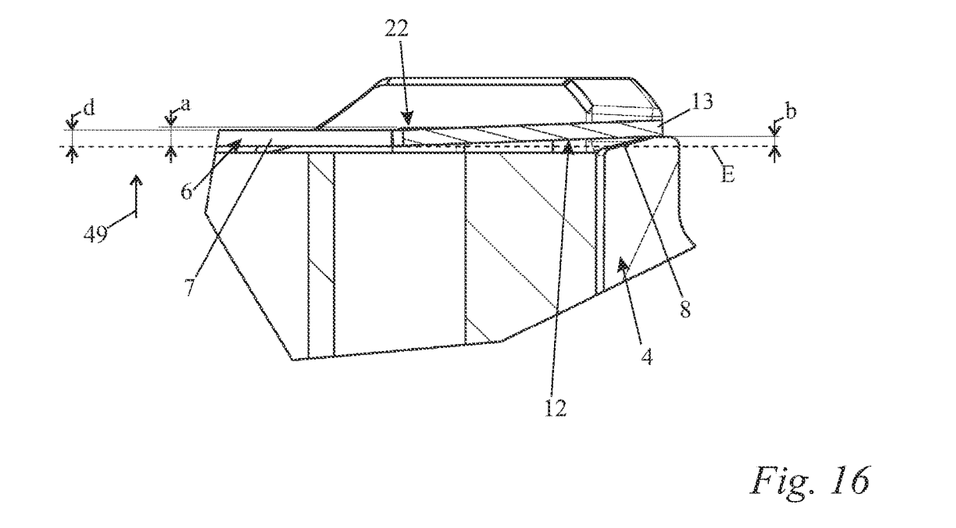
FIG. 16 is a detail illustration of the region that is indicated by XVI in FIG. 15.

The cover plate 6 is positioned in a tensioning contact region on the contact surface 8 of the base body 4 that is illustrated in FIGS. 12 and 16. The tensioning contact region of the support surface 8 of the base body 4 comprises a largest distance b to the virtual plane E (FIG. 16). The largest distance b of the tensioning contact region of the support surface 8 to the virtual plane E in the illustrated embodiment is smaller than the smallest distance a of the projection contact region of the projection contact surface 24 to the virtual plane E.

The cover plate 6 comprises a thickness d illustrated in FIGS. 16 and 18. The thickness d of the cover plate 6 is constant in the embodiment. The sum of thickness d of the cover plate 6 and the largest distance b between the tensioning contact region of the support surface 8 and of the virtual plane E corresponds at least to the smallest distance a between the projection contact region of the projection contact surface 24 and the virtual plane E. In this way, it is ensured that, in the connected state of base body 4 and cover plate 6, the projection 22 with its top side 11 is pretensioned in axial direction 49 against the projection contact surface 24 of the rim 23 of the opening 21 of the base body 4. In this way, the cover plate 6 is clamped with the projection 22 in the opening 21 of the base body 4. In this way, the cover plate 6 is secured against accidentally being pulled out of the opening 21 of the base body 4 in a direction opposite to the transverse direction 40. Due to the clamping action of the cover plate 6 in the base body 4, it is prevented that the cover plate 6 vibrates upon rotation of the spring casing 1. In this way, wear is reduced.

Figure 14:
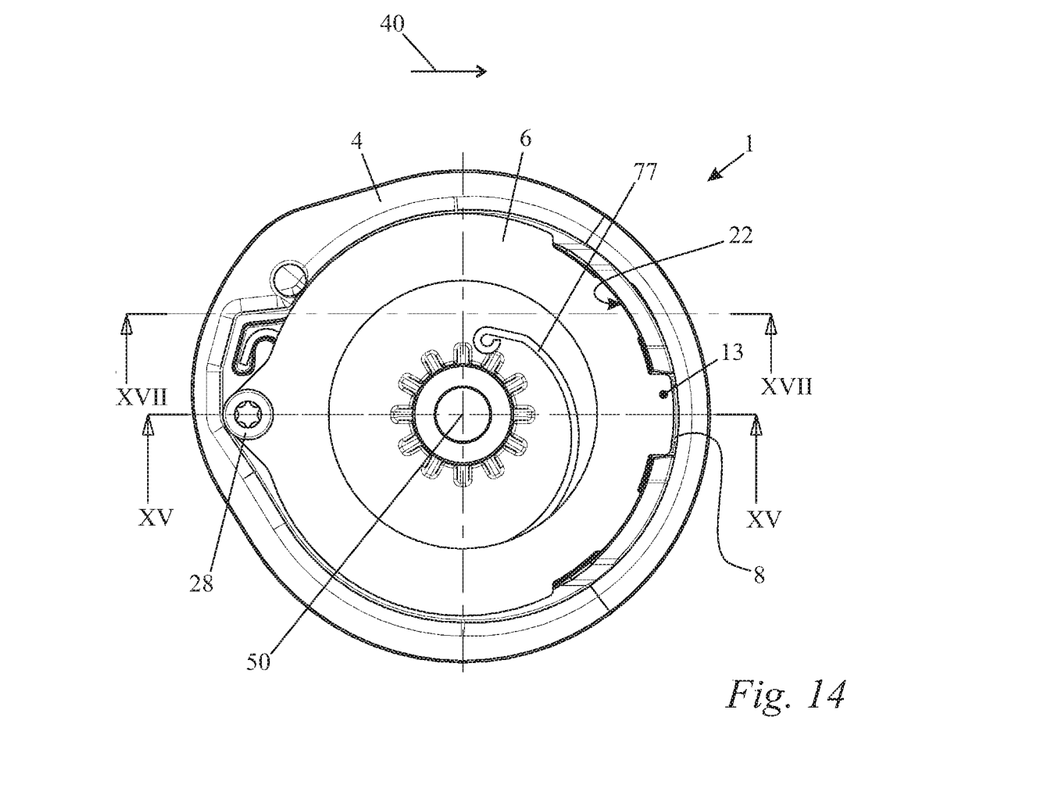
FIG. 14 is a plan view from above onto the spring casing of FIG. 3 in the connected state of base body and cover plate.
Figure 15:
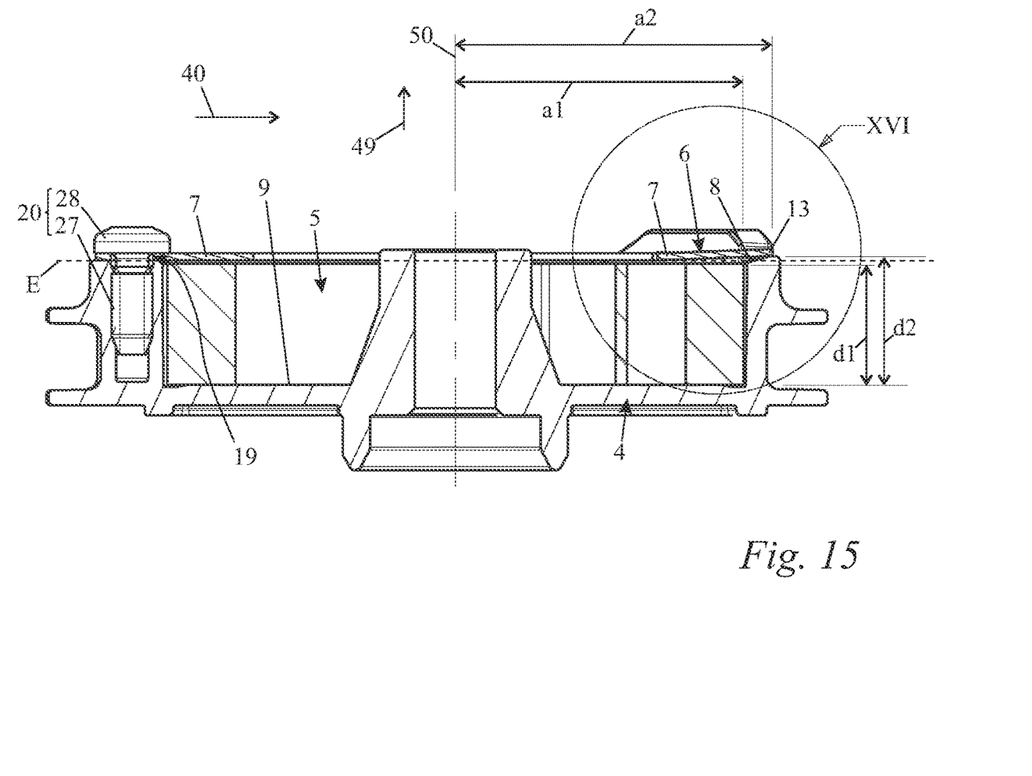
FIG. 15 shows a section along the section plane XV-XV indicated in FIG. 14.

FIG. 15 shows a section along the section plane XV-XV indicated in FIG. 14. The section plane XV-XV contains the contact surface 8 and extends through the center axis 50. The section plane XV-XV contains in addition a second connecting means 20. As can be seen in FIG. 15, the contact surface 8 is positioned at a slant relative to the virtual plane E. The contact surface 8 comprises a smallest distance a1 measured relative to the center axis 50 in transverse direction 40. The contact surface 8 comprises a largest distance a2 relative to the center axis 50 measured in transverse direction 40. The support surface 8 comprises a smallest distance d1 measured in axial direction 49 relative to the bottom 9 of the spring receptacle 5. The contact surface 8 comprises a largest distance d2 measured in axial direction 49 relative to the bottom 9 of the spring receptacle 5. The contact surface 8 comprises its largest distance d2 relative to the bottom 9 at the location of largest distance a2 relative to the center axis 50. The contact surface 8 comprises its smallest distance d1 relative to the bottom 9 at the location of the smallest distance a1 relative to the center axis 50. The distance d1, d2 measured in axial direction 49 between the bottom 9 of the spring receptacle 5 and the contact surface 8 increases in particular with increasing distance a1, a2 relative to the center axis 50. This increase is realized advantageously continuously. Due to this slant of the contact surface 8, the tensioning protrusion 13 can be pushed in a simple way in transverse direction 40 onto the contact surface 8. As illustrated in FIG. 15, the tensioning protrusion 13 is lifted in axial direction 49 in comparison to the cover body 7 of the cover plate 6. This can be seen also in the detail illustration of FIG. 16. The tensioning protrusion 13 is contacting with its bottom side 12 the contact surface 8 of the base body 4. The contact surface 8 comprises at its largest distance d2 to the bottom 9 an axial distance to the virtual plane E. The contact surface 8 can also encompass a section in which the surface is parallel to the plane E. In this case, in the connected state of base body 4 and cover plate 6, the tensioning protrusion 13 of the cover plate 6 is contacting the contact surface 8 at least at the transition between the region that is slanted relative to the virtual plane E and the section in which the contact surface 8 is parallel to the plane E.

Figure 17:
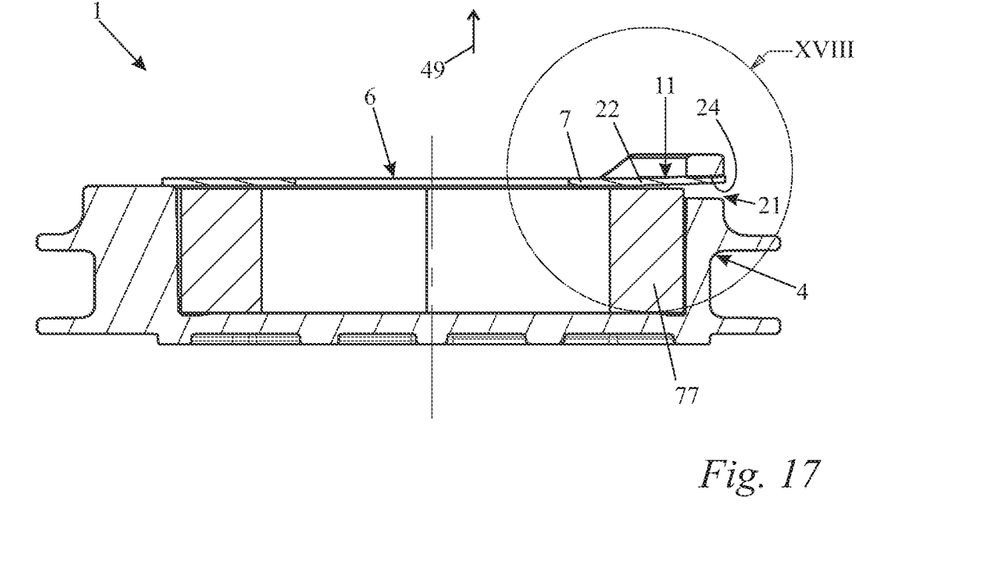
FIG. 17 shows a section view along the section plane that is indicated by XVII-XVII in FIG. 14.

FIG. 17 shows a section along the section plane XVII-XVII illustrated in FIG. 14. The section plane XVII-XVII extends in transverse direction 40 and contains the projection 22. The section plane XVII-XVII extends parallel to the section plane XV-XV. The section plane XVII-XVII does not contain the center axis 50. As illustrated in FIGS. 17 and 18, the projection 22 is contacting with the top side 11 the projection contact surface 24 of the rim 23 of the opening 21 of the base body 4. As a result of the slanted contact surface 8, which is illustrated in FIG. 15 and FIG. 16 and pushes the tensioning protrusion 13 in axial direction 49 upwardly, the projection 22 is forced in axial direction 49 against the projection contact surface 24. A movement of the projection 22 in axial direction 49 is limited by the projection contact surface 24. In this way, the cover body 7 is held at the base body 4.

Figure 13:
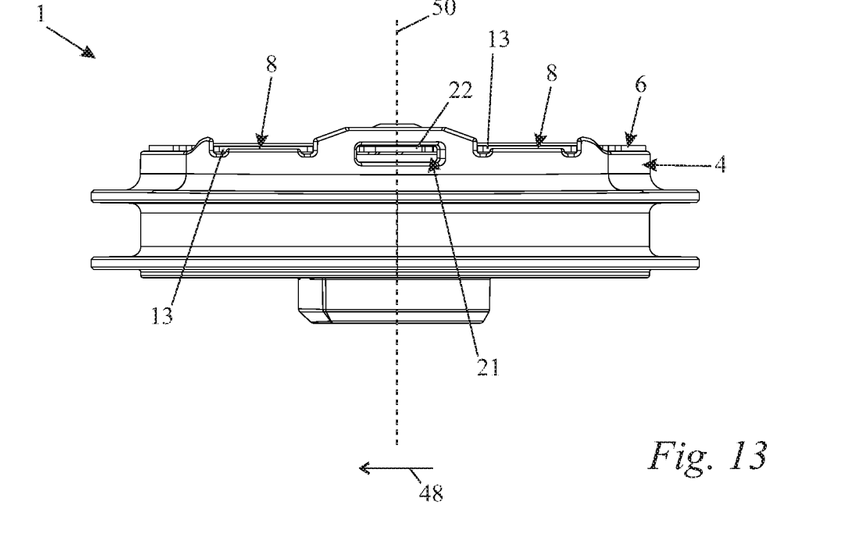
FIG. 13 is a schematic side view of the circumferential side of an alternative embodiment of the spring casing.

This is in particular the case when, as in all embodiments with the exception of the embodiment according to FIG. 13, a second projection 25 at the cover plate 6 and a second opening 26 in the base body 4 are provided. This can be seen particularly well in the FIGS. 6 and 10, for example. The contact surface 8 is arranged between the opening 21 and the second opening 26 in circumferential direction 48. In the connected state of base body 4 and cover plate 6, the top side 11 of the cover plate 6 is contacting the second opening 26 in the region of the second projection 25, as described above for the projection 22 in relation to opening 21. The second projection 25 corresponds with the opening 26. As can be seen in FIG. 10, in the connected state of base body 4 and cover plate 6, the cover plate 6 is advantageously mirror-symmetrical relative to a plane defined by the transverse direction 40 and the axial direction 49 and containing the center axis 50. Correspondingly, the contact surface 8 for the tensioning protrusion 13 is arranged mirror-symmetrically between the two openings 21 and 26 in the circumferential direction 48. The cover plate 6 is reversibly mountable. The bottom side 12 of the cover plate 6, after turning the cover plate 6, can function as a top side of the cover plate 6. The cover plate 6 can be mounted on the base body 4 with the bottom side 12 facing the spring receptacle 5 as well as with the bottom side 12 facing away from the spring receptacle 5.

The contact surface 8 comprises a center 31 relative to the circumferential direction 48. The transverse direction 40 extends, beginning at the center axis 50, in the direction toward the center 31. The two openings 21 and 26 are also mirror-symmetrical relative to the plane that contains the center axis 50 and that is defined by the transverse direction 40 and the axial direction 49. Due to the geometric configuration of the cover plate 6 and of the corresponding arrangement of the two openings 21 and 26 in the base body 4, tilting of the cover plate 6 about an axis in transverse direction 40 upon pretensioning the projections 22 and 25 is prevented. The cover plate 6 is mirror-symmetrical at least relative to the function-relevant contours. The symmetry axis of the cover plate 6 is oriented in transverse direction 40. The cover plate 6 in this way can be mounted when rotated about 180° about the transverse direction 40.

The projections 22 and 25 which are neighboring each other are arranged on the cover plate 6 in a circumferential angle range α of less than 180° measured in the connected state of the cover plate 6 and of the base body 4 relative to the center axis 50. The circumferential angle range α is measured in a plane perpendicular to the center axis 50. All projections 22, 25 extends therefore in one half of the cover plate 6. Preferably, all projections 22, 25 and all tensioning protrusions 13 are extending in one half of the cover plate in the indicated circumferential angle range α. Preferably, the continuous circumferential angle range α is less than 135°. In the embodiment, the continuous circumferential angle range α is less than 100°. Accordingly, the cover plate 6 can be designed such that it is insertable in a simple way in transverse direction 40 into the openings 21 and 26. For this purpose, the projections 22 and 25 are shaped and arranged such that they can be inserted into the openings 21 and 26 in transverse direction 40.

As can be seen when looking at FIGS. 9 and 10, the spring receptacle 5 is limited in the direction radial to the center axis 50 by the circumferential wall 14 of the base body 4. The circumferential wall 14 of the spring receptacle 5 extends about center axis 50. As indicated in FIG. 10, the circumferential wall 14 has a smallest distance k to the center axis 50. The cover plate 6 is limited in the direction radial to the center axis 50 by an outer contour 18 of the cover plate 6. The outer contour 18 of the cover plate 6 extends in the connected state of the cover plate 6 and of the base body 4 about the center axis 50. In the connected state of cover plate 6 and base body 4, a distance a3 of the outer contour 18 of the cover plate 6 relative to the center axis 50 is less than 120% of the smallest distance k in a continuous circumferential angle range β of at least 270°. In the embodiment, the distance a3 of the outer contour 18 of the cover plate 6 relative to the center axis 50 is less than 110% of the smallest distance k within a continuous circumferential angle range β of at least 320°. In the continuous angle range β, no holes for passing through screws are provided in the cover plate 6. In this way, in the continuous angle range β, the cover plate 6 can be designed with a compact configuration in the direction radial to the center axis 50.

As illustrated in FIGS. 7 and 8, the recess 71 of the rope pulley 72 has a base 76. The recess 71 comprises a lateral rim 79. The lateral rim 79 adjoins the base 76. The lateral rim 79 delimits the recess 71 in the direction opposite to the axial direction 49. When looking at FIGS. 7, 8, and 10 together, it is apparent that the contour of the base 76 follows a circular shape in the continuous angle range β of at least 270°. When looking at FIGS. 7, 8 and 10 together, it is apparent that the contour of the lateral rim 79 follows a circular shape in the continuous angle range β of at least 270°.

As is illustrated in FIG. 10, the projection 22 of the connecting means 10, or the second projection 25, does not project in the direction that is radial to the center axis 50 past an outer circumferential wall of the base body 4 of the spring casing 1 within the continuous angle range β of at least 270°. In particular, the projection 22, or the second projection 25, ends within the wall thickness of the outer wall 29 of the base body 4 in the continuous angle range β of at least 270°.

As illustrated, for example, in FIG. 15, the spring casing 1 comprises a second connecting means 20 in addition to the connecting means 10 formed of the first part at the base body 4 and the second part at the cover plate 6. The second connecting means 20 secures the cover plate 6 against a movement relative to the base body in transverse direction 40. The second connecting means 20 comprises a further fastening element. The further fastening element is embodied separate from the base body 4 and separate from the cover plate 6. The further fastening element comprises a screw 28 in the embodiment. However, any other second connecting means can be provided which secures the cover plate 6 against a movement relative to the base body 4 in transverse direction 40, for example, a material fusion connection or a connection by hot stamping. The screw 28 is positioned at a distance relative to the center axis 50. The base body 4 comprises an inner thread 27. The inner thread 27 is provided for receiving the screw 28. The cover plate 6 comprises a hole 19 for passing through the screw 28. In the connected state of base body 4 and cover plate 6, the position of the hole 19 in the cover plate 6 coincides with the position of the inner thread 27 in the base body 4. In the connected state of base body 4 and cover plate 6, the screw 27 can be screwed through the hole 19 of the cover plate 6 into the inner thread 27 of the base body 4. In this way, the screw 27 secures the cover plate 6 against a movement opposite to the transverse direction 40. In this way, in addition to being clamped in the openings 21 and 26, the cover plate 6 is secured against being pulled out from the openings 21 and 26 in a direction opposite to the transverse direction 40. When at least a second connecting means 20 is provided, the tensioning of the cover plate 6 relative to the base body 4 can even be omitted. The at least one projection can thus be inserted also loosely into the at least one opening. In the embodiments, the inner thread 27 in the base body 4 is arranged opposite to the contact surface 8 relative to the center axis 50, viewed in the transverse direction 40. The connecting means 10 comprised of a first part at the base body 4 and a second part at the cover plate 6 and the second connecting means 20 comprising a further fastening element are advantageously arranged such that no or only a minimal imbalance is produced upon rotation of the spring casing 1 about the center axis 50. In FIG. 10, it can be seen that the material accumulation of the base body 4 for forming the opening 21 or the opening 26 is arranged oppositely positioned to a material accumulation of the base body 4 for forming a suspension location 78 for the connecting spring 77 and optionally for a rope knot.

The screw sleeve for the second connecting means 20 is arranged in an angle range of the spring casing 1 in which the spring casing diameter is enlarged anyway due to the suspension location 78 for the connecting spring 77 embodied as a suspension slot. In this way, the spring casing radius must not be enlarged at an additional location so that the cooling air flow past the spring casing is improved.

FIG. 13 shows an alternative embodiment of the spring casing 1. In the spring casing according to FIG. 13, only a single opening 21 for receiving a projection in the base body 4 is provided. At each side of the opening 21, relative to the circumferential direction 48, a contact surface 8 for a respective tensioning protrusion 13 is provided. The two tensioning protrusions 13 are arranged at the same location of the cover plate 6 as the two projections 22 and 25 in the embodiments according to the other Figures. The description in regard to the two projections 22 and 25 of the embodiment according to the other Figures applies in an analogous manner in regard to the arrangement of the two tensioning protrusions 13. Likewise, the description in regard to the openings 21 and 26 for the embodiment according to the other Figures relative to their position and arrangement applies in analogous manner to the contact surface 8 of the embodiment according to FIG. 13. In a simplified manner, it can be said that, in comparison to the embodiment according to the other Figures, in the embodiment according to FIG. 13 the openings 21 and 26 are replaced by contact surfaces 8 and the projections 22 and 25 are replaced by tensioning protrusions 13.

Further advantageous embodiments are obtained by discretionary combinations of the embodiments.

The specification incorporates by reference the entire disclosure of European priority document 19 176 934.8 having a filing date of May 28, 2019.

While specific embodiments of the invention have been shown and described in detail to illustrate the inventive principles, it will be understood that the invention may be embodied otherwise without departing from such principles.

What is claimed is:

1. A spring casing for a starter device for starting an internal combustion engine, wherein the spring casing comprises:
    a base body comprising a spring receptacle;
    a cover plate configured to at least partially cover the spring receptacle;
    a first connecting means configured to connect the cover plate and the base body to each other, wherein the first connecting means secures the cover plate against a movement relative to the base body in a direction of a center axis of the spring casing;
    wherein the first connecting means is comprised of a first part at the base body and a second part at the cover plate;
    wherein the cover plate comprises a cover body and a projection;
    wherein the first part of the first connecting means at the base body is an opening in the base body and wherein the second part of the first connecting means at the cover plate is the projection of the cover plate, wherein the projection of the cover plate corresponds with the opening in the base body;
    wherein the opening in the base body extends in a transverse direction transverse to the center axis;
    wherein the cover body of the cover plate and the projection of the cover plate extend in a common plane when the cover plate and the base body are not connected to each other;
    wherein the projection of the cover plate is configured to be inserted into the opening in the base body in an insertion direction, wherein the insertion direction corresponds to the transverse direction transverse to the center axis.

2. The spring casing according to claim 1, wherein the base body is configured to connect to the cover plate by a relative movement of the opening in the base body relative to the projection of the cover plate the transverse direction transverse to the center axis such that the cover plate is secured against the movement relative to the base body in the direction of the center axis of the spring casing.

3. The spring casing according to claim 1, wherein the opening in the base body extends completely through the base body in the transverse direction transverse to the center axis.

4. The spring casing according to claim 1, wherein the projection of the cover plate, in a connected state of the cover plate and of the base body, projects past the spring receptacle in the transverse direction transverse to the center axis.

5. The spring casing according to claim 1, comprising at least two of the first connecting means which, in a connected state of the cover plate and of the base body, are arranged in a circumferential angle range of less than 180°, wherein the circumferential angle range is measured relative to the center axis.

6. The spring casing according to claim 1, wherein the opening of the base body is surrounded by a circumferentially closed rim.

7. The spring casing according to claim 1, wherein the projection of the cover plate when inserted into the opening of the base body is pretensioned against a rim of the opening of the base body.

8. The spring casing according to claim 7, wherein the cover plate comprises a top side and a bottom side, wherein the base body comprises a projection contact surface arranged in the opening of the base body, wherein the projection of the cover plate contacts with the top side of the cover plate the projection contact surface arranged in the opening of the base body, wherein the base body comprises a contact surface arranged outside of the opening of the base body, and wherein the bottom side of the cover plate contacts the contact surface of the base body arranged outside of the opening of the base body.

9. The spring casing according to claim 8, wherein the contact surface of the base body is positioned at a slant relative to a virtual plane extending perpendicularly to the center axis.

10. The spring casing according to claim 1, further comprising a second connecting means configured to secure the cover plate against a movement relative to the base body in the transverse direction transverse to the center axis.

11. The spring casing according to claim 10, wherein the second connecting means comprises a screw positioned at a distance to the center axis.

12. The spring casing according to claim 1, wherein the spring casing is embodied as one piece together with a rope pulley for a starter rope of the starter device.

13. The spring casing according to claim 12, wherein the rope pulley comprises a recess with a base configured to receive the starter rope, wherein the recess extends circumferentially about the center axis, and wherein a contour of the base of the recess has a circular shape in a continuous angle range of at least 270°.

14. A starter device for starting an internal combustion engine, the starter device comprising a spring casing, wherein the spring casing comprises:
- a base body comprising a spring receptacle;
- a cover plate configured to at least partially cover the spring receptacle;
- a first connecting means configured to connect the cover plate and the base body to each other, wherein the first connecting means secures the cover plate against a movement relative to the base body in a direction of a center axis of the spring casing;
- wherein the first connecting means is comprised of a first part at the base body and a second part at the cover plate;
- wherein the cover plate comprises a cover body and a projection;
- wherein the first part of the first connecting means at the base body is an opening in the base body and wherein the second part of the first connecting means at the cover plate is the projection of the cover plate, wherein the projection of the cover plate corresponds with the opening in the base body;
- wherein the opening in the base body extends in a transverse direction transverse to the center axis;
- wherein the cover body of the cover plate and the projection of the cover plate extend in a common plane when the cover plate and the base body are not connected to each other;
- wherein the projection of the cover plate is configured to be inserted into the opening in the base body in an insertion direction, wherein the insertion direction corresponds to the transverse direction transverse to the center axis.

15. The spring casing according to claim 1, wherein the cover plate comprises a constant thickness.

16. The spring casing according to claim 1, wherein the cover plate as a whole extends exclusively in one plane when the cover plate and the base body are not connected to each other.

* * * * *